Feb. 7, 1950     L. SCHWARTZBERG     2,496,755
FROZEN EGG METHOD AND CONTAINER
Filed April 9, 1945
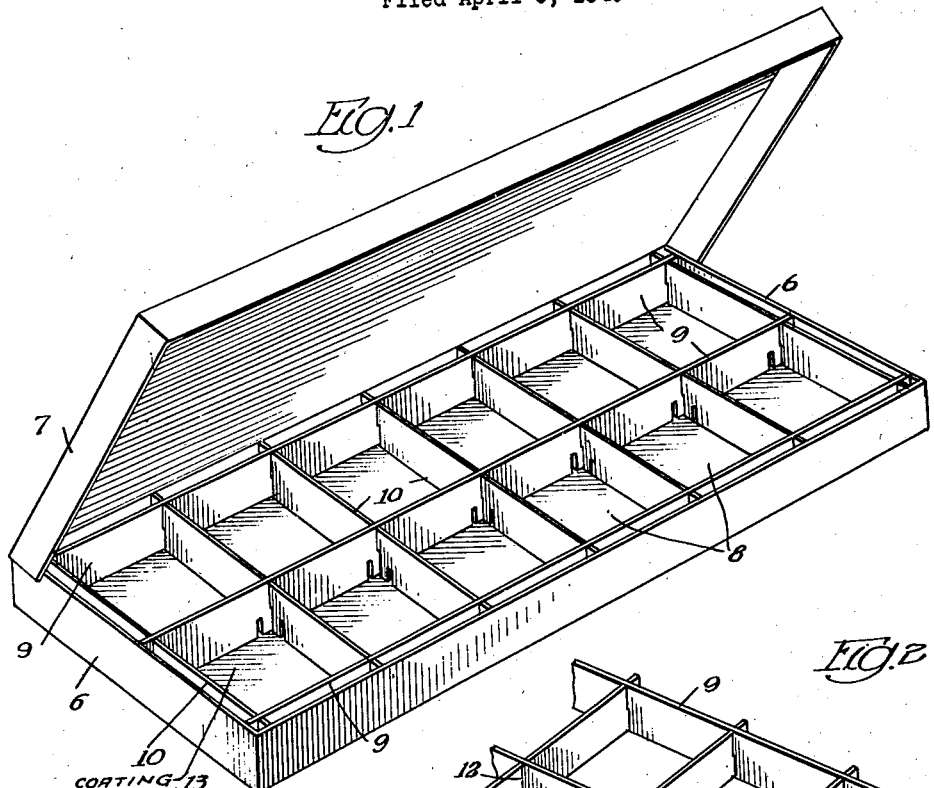
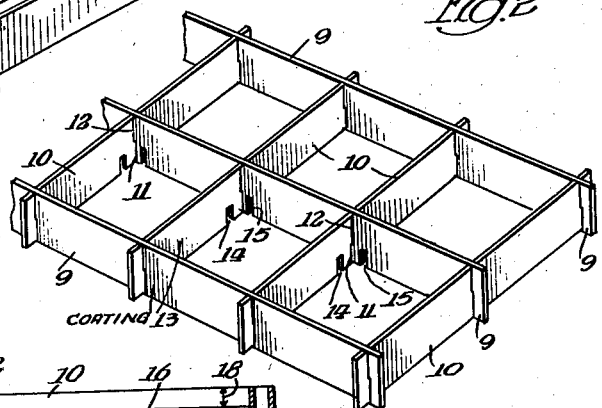
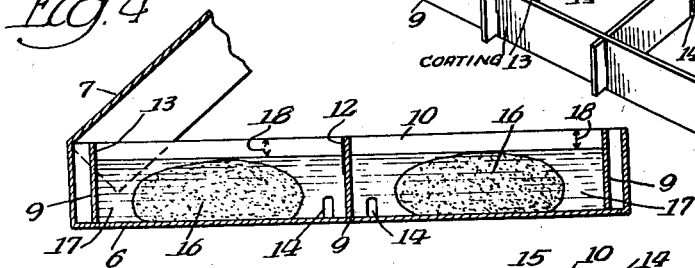
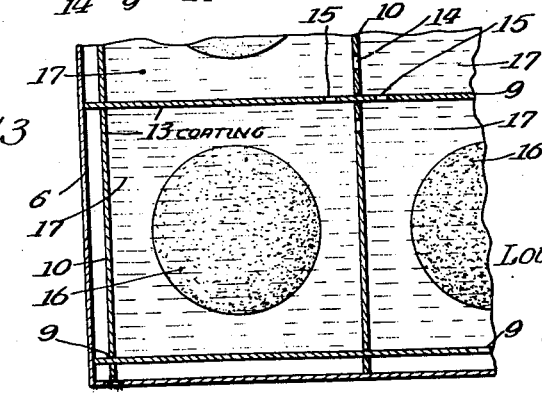
Inventor
Louis Schwartzberg Patented Feb. 7, 1950

2,496,755

UNITED STATES PATENT OFFICE 2,496,755

FROZEN EGG METHOD AND CONTAINER

Louis Schwartzberg, Chicago, Ill.

Application April 9, 1945, Serial No. 587,292

3 Claims. (Cl. 99—196)

This invention relates in general to the quick freezing of fresh eggs broken and separated from their shell and deposited in cartons having individual compartments for each egg; after which they are quickly frozen and may be stored for future use in the frozen condition ready for shipment, sale and use.

One object of the invention is to provide a new and improved method for quick freezing eggs in separated liquid form by retaining the individual yolks in a position surrounded by the egg whites and in levelling off the whites in multiple egg-holding cartons so that the frozen eggs will be contained in a most compact and readily usable form and condition.

Another object of the invention is to provide a method for the quick freezing of fresh eggs which includes a container of new and improved construction and results in a new and improved product.

Other objects of the invention and various advantages and characteristics of the present method will be apparent from a consideration of the following detailed description.

The invention consists in the several novel features and the practice and application of the method as more particularly defined by the claims at the conclusion hereof.

In the drawing which accompanies and forms a part of this specification or disclosure, and in which like numerals of reference denote corresponding parts throughout the several views:

Figure 1 is a perspective of a container in accordance with this invention of a height less than that commonly employed in the ordinary egg carton so that a much greater number of the present cartons may be contained in a standard egg case;

Figure 2 is a perspective view of two partition parts showing communicating notches therein;

Figure 3 is a plan view of a compartment with an egg therein, the yolk unbroken and spaced from the walls; and Figure 4 is a sectional view of an egg in a compartment as in Figure 3.

There are several established ways of treating and preserving eggs for use, one of which is to pack the eggs in cartons or in containers having separate compartments, some of these eggs being coated with wax, hot oil or other materials before placed in cold storage and then kept. Another method is to break the whites and yolks together in a large container and to freeze the mixture until ready for use. Still another method is to produce powdered eggs which are placed in cold storage or they are powdered out of storage eggs and may be used when desired.

The present invention relates to an entirely different method of quick freezing fresh eggs which consists in breaking each of the eggs into a separate compartment of an egg carton without breaking the yolk, in quick freezing the egg in the container and keeping it in frozen condition so that one or more eggs may be broken from a carton and used separately or in conjunction with others as desired.

Since the eggs in liquid form occupy much less space than unbroken eggs in an egg case, the liquid eggs are placed in shallower compartments which have communication between them so that the whites of the eggs may flow or pass from one compartment to the other levelling off in the carton but retaining the yolk in unbroken condition and normally centered within each compartment. The partitions and walls forming the compartments may be coated with wax or other material to provide a sanitary covering and to prevent the liquid eggs from adhering thereto, and also to permit the frozen eggs to be more readily broken from the carton.

In the operation of packing the eggs in the cartons each carton is held in a horizontal position without agitation or movement in any direction so that eggs broken into the compartments will tend to center the yolks therein and cause the leakage or communication between the compartments. The whites of the eggs will flow or pass from one compartment to the other assuming a common level in the compartments of each carton so that each egg will be substantially the same size. The partition in the cartons are of such a height that when the liquid eggs level off in the compartments a small portion of the wall or partition of each compartment will project above the upper surface of the liquid egg therein. When the eggs are frozen in the cartons, the projecting portions of the walls or partitions will enable these portions to be grasped in raising the cartons and separating the walls and partitions from each other, in separating or removing the frozen eggs without digging the tips of the fingers into the product and thus providing for sanitary handling of the frozen eggs.

Quick frozen eggs in accordance with this invention are preferably placed in containers similar to the well known type of egg cartons, the difference being that for this type of frozen eggs the cartons may be very much less in size than the standard egg cartons so that as many as one hundred twenty dozen small or "pullet"

eggs, ninety dozen medium sized eggs or sixty dozen large eggs may be packed in a standard thirty dozen egg case. This is a great saving in space as heretofore only thirty dozen eggs of any grade or size could be packed in a standard egg case. From this it will be apparent that the depth of the carton contemplated for use in this invention may be approximately one-quarter or even less than that of the standard egg carton.

An egg carton of this type is illustrated in Figure 1 of the invention having an outer box or container 6 with a lid or cover 7 hinged thereto and foldable downwardly over the container. The height of this container is only a fraction of that of the ordinary egg container depending upon the size or grade of eggs which it is to contain. Within the container are separate egg receiving compartments 8 formed by longitudinal strips 9 and transverse partitions 10, each having intersecting slots 11 and 12 respectively in their edges to form close fitting walls and partitions of a uniform size around each compartment.

These strips and partitions fit tightly against the bottom of the container and the walls of the strips and partitions may have a waxlike or other coating 13 which prevents the adherence of the egg when in its liquid or frozen state to the material of carton or the container. In order to provide communication between adjacent compartments each of the partitions has perforations therethrough or notches 14 in the lower edges and the central strip 9 has similar conducting passageways comprising notches 15 adjacent each side of the slot 11 at the lower edge of the strip. These notches 14 and 15 are preferably located in the corners of the compartments where they will be in the most remote position from the center of the compartment and thus they will less affect a yolk 16 of an egg deposited in the compartment with the white 17 surrounding it and filling the outside of the compartment around the yolk. The surface tension of the yolk tends to keep it centered in each compartment and equally spaced from the walls thereof.

When a carton is filled with a number of eggs deposited therein in this manner they will tend to level off in the compartments to a common height, the whites of the eggs flowing or passing from one compartment to the other until all of the compartments are at a common level. The height of the strips and partitions forming the compartments are such that when the liquid eggs for that particular carton are levelled in the compartments there will be a portion 18 of the upper edge of each partition or cross-piece which extends above the upper surface of the egg therein. This projecting portion is to provide means for obtaining a finger hold of that portion of the carton so that after the eggs are frozen therein that particular portion of the carton may be engaged, raised, broken off and handled without contacting the adjacent surface of the egg therein and so that an individual frozen egg or a number of such eggs may be broken from the remainder of the carton for use when desired.

In operation after a carton has been suitably filled with liquid eggs, the carton is allowed to stand for a few minutes to insure completion of the levelling operation within the compartments. The carton is closed and a quick freezing temperature is applied for a sufficient time to solidly freeze the liquid eggs so that the eggs do not lose their taste of freshness. After being thus frozen they are placed in a freezing temperature but not as cold as the first quick freezing application. The eggs thus prepared are now ready for shipment or storage. They are commonly placed in egg cases of a standard size and since the present cartons are much thinner than the standard egg cartons a greater number of them can be packed in a standard case, depending upon the size or grade of the frozen eggs. Because of the levelling of the liquid eggs in the cartons it is possible to put in more than sixty, ninety, or one hundred twenty dozen of the various grades as stated above in the standard thirty dozen egg cases.

This invention is not to be understood as restricted to the details set forth since these may be modified within the scope of the appended claims without departing from the spirit and scope of the invention.

Having thus described the invention, what I claim as new and desire to secure by Letters Patent is:

1. That improvement in processing eggs preparatory to use which comprises first taking a carton having the interior thereof divided into comparatively shallow, side by side compartments by way of partitions having the inner surfaces thereof coated with wax-like non-adhering material and provided in the bottom portions thereof with small sized openings to effect communication between the bottom portions of the compartments, and introducing into each compartment the white and unbroken yolk of an egg, then permitting the carton to stand until the whites of the eggs in the compartments by flow via the openings in the partitions adjust themselves so that the upper surfaces thereof are at a common level, and then subjecting the carton to a freezing temperature in order to solidify the whites and yolks of the eggs in the compartments.

2. That improvement in processing eggs preparatory to consumption which comprises first taking a substantially flat, elongated carton having the interior thereof divided into comparatively shallow side by side rectangular compartments by way of partitions having the inner surfaces thereof coated with wax-like non-adhering material and provided in the bottom portions thereof with small sized openings to effect communication between the bottom portions of the compartments, and introducing into each compartment the white and unbroken yolk of an egg, then permitting the carton to stand for a sufficient period of time to cause the white to assume a common level and cause the yolks to become centered within the compartments, and thereafter subjecting the carton to a quick freezing temperature in order to solidify the whites and yolks of the eggs in the compartments, and finally retaining the cartons at a higher but freezing temperature until the individual frozen whole eggs are desired for use.

3. A package of frozen shelled eggs comprising a shallow container having a bottom and side walls, a plurality of frozen eggs including both the white portions and unbroken yolks thereof positioned within the said casting with the upper surface of the white portions substantially level, the white portion of each of said eggs positioned to surround its respective yolk, the white portions of adjacently positioned eggs being connected together by reduced sections of egg white extending therebetween, said reduced sections extending from the bottom of the container to a point intermediate the bottom and upper surface of the said white portions, and a cover for said container.

LOUIS SCHWARTZBERG.

REFERENCES CITED

The following references are of record in the file of this patent:

UNITED STATES PATENTS

| Number | Name | Date |
|---|---|---|
| 154,553 | Kuh | Sept. 1, 1874 |
| 1,398,860 | Hussey | Nov. 29, 1921 |
| 1,777,483 | Copeman | Oct. 7, 1930 |
| 2,013,896 | Pennington | Sept. 10, 1935 |
| 2,045,183 | Fowle | June 23, 1936 |

OTHER REFERENCES

Tressler-Freezing Preservation of Foods, page 176, Avi. Pub. Co., N. Y. C. 1943.

Food Industries, May 1943, pages 67–68.